UNITED STATES PATENT OFFICE.

CONSTANTINE B. WARRAND, OF SAVANNAH, GEORGIA, ASSIGNOR OF TWO-THIRDS TO JOHN L. HAMMOND AND CLAVIUS PHILLIPS.

PROCESS OF AND COMPOSITION FOR TANNING.

SPECIFICATION forming part of Letters Patent No. 450,121, dated April 7, 1891.

Application filed October 22, 1890. Serial No. 368,954. (No specimens.)

*To all whom it may concern:*

Be it known that I, CONSTANTINE B. WARRAND, a subject of the Queen of Great Britain, residing at Savannah, in the county of Chatham and State of Georgia, have invented certain new and useful Improvements in Tanning; and I do hereby declare the following to be a full, clear, and exact description of the invention, such as will enable others skilled in the art to which it appertains to make and use the same.

My invention relates to an improved method of tanning hides; and it consists in subjecting the green or dry hides, after they have gone through the usual preparatory process of softening, depilating, plumping, unhairing, fleshing, and bating, to a solution of the acids, gums, and juices extracted from the leaves and stems of leaves of the dwarf, saw, blue or cabbage palmetto (*Sabal serrulata*) and its congeners, found in the southern United States and elsewhere, as will hereinafter more fully appear.

Hitherto it has been the custom to tan hides by subjecting them in the several vats to the action of water and the tannic acid contained in oak, hemlock, and other barks, with frequent additions of sumac, divi-divi, or other substances containing tannic acid. When the usual preparation has taken place, they are placed in handling-vats, in which the tan-liquor has to be changed frequently and its strength gradually increased, and at the end of a few weeks the hides are moved to the lay-away vats and left for months.

I have discovered by numerous experiments that the leaves and their stems of the various kinds of palmettos, preferably when green, are rich in certain acids, gums, and juices which are extracted by my process and are useful in tanning, and are as a compound analogous to the quercitrine obtained from oak bark, and it consists in great part of tannic and gallic and gallo-tannic acids and is almost free of coloring-matter contained in oak and hemlock. I have found that the process of tanning is much facilitated by the use of this product of palmetto leaves, as the tannic acid therein contained, with the other constituents of the resulting liquor, has the capacity of changing hides, animal fiber, or gelatine into an insoluble compound, and speedily converts the animal fiber into leather, and in a much shorter time and more thoroughly than when the barks of oak, hemlock, &c., are used. A series of baths of increased strength is not necessary, and can be dispensed with.

I can tan a hide in three weeks or more, according to its thickness and with three changes of tan-liquor, the strength of the liquor not being altered.

I obtain the palmetto liquor by steeping the comminuted or whole leaves of the plants of saw palmetto, (*Sabal serrulata*,) dwarf palmetto, (*Sabal Adansonii*,) cabbage palmetto, (*Sabal palmetto*,) or blue palmetto, (*Chamerops hystrix*,) or any of the like plants in cold water, or preferably at a heat of 100° Fahrenheit, for twenty-four hours, and then the water is raised to about 150° Fahrenheit, never up to the boiling-point, as a high temperature destroys the properties of the infusion and causes too much gummy matter to dissolve. The mass is held at this point until the leaves are thoroughly steeped, but not long enough to cause fermentation. It will then contain the acids and juices which form the tanning compound.

My process of tanning is as follows: A sufficient quantity of the comminuted leaves and stems are placed in the tan-vat to cover its bottom and hides placed therein with the flesh side downward. Then alternate layers of the liquor of palmetto and hide are introduced until the vat is filled and the hides covered with the liquor. The hides are allowed to remain for one week or longer, when the spent liquor is pumped out and replaced with the liquor, as before. This is repeated several times until the hide is perfectly tanned, (which will be in three or four weeks, or longer in case of a very heavy hide,) and is then ready to be treated in the usual manner to be converted into curried leather, as, my process being for tanning alone, I make no claim to dressing the tanned hides, which may be accomplished in the usual manner.

My product is superior to any of the barks for tanning hides, and is calculated to take the place of them, as the supply of barks is nearly exhausted while ten million acres of the southern United States is covered by an indigenous growth of palmetto which is practically inexhaustible. Moreover my product can be evaporated down to a concentrated liquid and even to a solid point for shipment, and when to be used can be liquefied by the addition of water to the desired consistence.

Having thus described my invention, what I claim therein as new, and desire to secure by Letters Patent, is—

1. The process of tanning hides by subjecting them to a series of baths in a compound extracted from the comminuted or whole leaves of the saw palmetto (*Sabal serrulata*) and its congeners infused in water, all substantially as described.

2. The extract for tanning found in the leaves and their stems of the saw palmetto (*Sabal serrulata*) and its congeners, extracted and treated in the manner substantially as described.

In testimony whereof I affix my signature in presence of two witnesses.

CONSTANTINE B. WARRAND.

Witnesses:
W. F. GARDNER, Jr.,
EDW. J. KEEGIN.